(12) United States Patent
Cai et al.

(10) Patent No.: US 8,265,080 B2
(45) Date of Patent: Sep. 11, 2012

(54) SYSTEM AND METHOD FOR RETRANSMISSIONS IN A DISCONTINUOUS RECEPTION CONFIGURED SYSTEM

(75) Inventors: Zhijun Cai, Euless, TX (US); James Earl Womack, Bedford, TX (US)

(73) Assignee: Motorola Mobility LLC, Libertyville, IL (US)

( * ) Notice: Subject to any disclaimer, the term of this patent is extended or adjusted under 35 U.S.C. 154(b) by 1029 days.

(21) Appl. No.: 12/193,963

(22) Filed: Aug. 19, 2008

(65) Prior Publication Data

US 2009/0052367 A1 Feb. 26, 2009

Related U.S. Application Data

(60) Provisional application No. 60/956,845, filed on Aug. 20, 2007, provisional application No. 60/974,653, filed on Sep. 24, 2007.

(51) Int. Cl.
| | |
|---|---|
| H04L 12/28 | (2006.01) |
| H04B 7/14 | (2006.01) |
| H04B 1/16 | (2006.01) |
| G08C 17/00 | (2006.01) |

(52) U.S. Cl. ............... 370/395.2; 370/311; 370/315; 455/343.2; 455/343.4

(58) Field of Classification Search ............ 370/311, 370/315, 395.2; 455/343.2, 343.4
See application file for complete search history.

(56) References Cited

U.S. PATENT DOCUMENTS

| | | | |
|---|---|---|---|
| 6,973,052 B2 | 12/2005 | Wang et al. | |
| 6,975,629 B2 | 12/2005 | Welin | |
| 7,027,400 B2 | 4/2006 | O'Neill | |
| 7,221,945 B2 | 5/2007 | Milford et al. | |
| 2003/0157887 A1 | 8/2003 | Willenegger | |
| 2004/0042492 A1* | 3/2004 | Suzuki et al. | 370/473 |
| 2004/0093174 A1 | 5/2004 | Lander | |
| 2004/0185918 A1 | 9/2004 | Fan et al. | |
| 2004/0240423 A1* | 12/2004 | Anttila | 370/349 |
| 2004/0253996 A1 | 12/2004 | Chen | |
| 2004/0264433 A1 | 12/2004 | Melpignano | |
| 2005/0009578 A1 | 1/2005 | Liu | |
| 2005/0047387 A1 | 3/2005 | Frederiksen et al. | |
| 2005/0063330 A1 | 3/2005 | Lee et al. | |
| 2005/0128998 A1 | 6/2005 | Jelitto et al. | |
| 2005/0201353 A1 | 9/2005 | Lee et al. | |
| 2005/0254444 A1 | 11/2005 | Meier et al. | |
| 2005/0254459 A1 | 11/2005 | Qian | |
| 2005/0281222 A1 | 12/2005 | Ranta-Aho et al. | |
| 2006/0019641 A1 | 1/2006 | Vayanos et al. | |
| 2006/0252449 A1 | 11/2006 | Ramesh | |

(Continued)

FOREIGN PATENT DOCUMENTS

CA 2344911 A1 12/2001

(Continued)

OTHER PUBLICATIONS

Research in Motion Limited, "Semi-persistent Scheduling and DRX Control", 3GPP TSG-RAN-WG2 Meeting # 59, Aug. 2007.

(Continued)

*Primary Examiner* — Kenny Lin

(57) ABSTRACT

Methods of performing retransmissions in respect of communications, uplink and/or downlink, on semi-persistent resources are provided. Various embodiments include: the mobile device keeps its radio on for an additional period immediately following an awake period upon determining there will be a retransmission; the mobile device turning its radio on for an additional period separate and distinct from the awake period.

23 Claims, 12 Drawing Sheets

U.S. PATENT DOCUMENTS

| | | | |
|---|---|---|---|
| 2007/0004374 | A1 | 1/2007 | Kneckt |
| 2007/0060167 | A1 | 3/2007 | Damnjanovic et al. |
| 2007/0061433 | A1 | 3/2007 | Reynolds et al. |
| 2007/0082620 | A1 | 4/2007 | Zhang et al. |
| 2007/0087724 | A1 | 4/2007 | Jang et al. |
| 2010/0130214 | A1* | 5/2010 | Ahluwalia ............... 455/450 |
| 2011/0013506 | A1* | 1/2011 | Ishii et al. ............... 370/208 |

FOREIGN PATENT DOCUMENTS

| | | |
|---|---|---|
| EP | 0529269 A2 | 3/1993 |
| EP | 0 924 890 A2 | 6/1999 |
| EP | 1 289 181 A1 | 3/2003 |
| EP | 1450240 A2 | 8/2004 |
| EP | 1 492 263 A1 | 12/2004 |
| KR | 1020010080057 A | 8/2001 |
| KR | 1020040050422 A | 6/2004 |
| WO | WO 00/21236 | 4/2000 |
| WO | WO 02/33875 A1 | 4/2002 |
| WO | WO 03/096707 A2 | 11/2003 |
| WO | WO 2004/004194 | 1/2004 |
| WO | WO 2005/022772 | 3/2005 |
| WO | WO 2006/002379 | 1/2006 |
| WO | WO 2006/046754 | 5/2006 |
| WO | WO 2006/103498 A1 | 10/2006 |
| WO | WO 2007/014021 A2 | 2/2007 |
| WO | WO 2007/025138 A2 | 3/2007 |
| WO | WO 2007/073118 A1 | 6/2007 |
| WO | WO 2007/089797 A2 | 8/2007 |

OTHER PUBLICATIONS

Shun-Ren Yang and Yi-Bing Lin, "Modeling UMTS Discontinuous Reception Mechanism" IEEE Transactions on Wireless Communications, Jan. 2005, pp. 312-319, vol. 4., No. 1.

Ericsson, Semi Persistent Scheduling, TSG-RAN WG2 Meeting # 55, Oct 2006.

Ericsson, "Performance Gains of the Semi-Autonomous DRX Scheme for LTE", 3GPP TSG-RAN WG2 Meeting # 58-bis, Jun. 2007.

Nokia, Nokia Siemens Networks, "Further Considerations on DL Semi-Persistent Scheduling", 3 GPP TSG-RAN WG2 Meeting # 58, May 2007.

Jiang, Dajie et al.; Principle and Performance of Semi-Persistent Scheduling for VoIP in LTE System; International Conference on Wireless Communications, Networking and Mobile Computing, 2007 (WiCom 2007), Sep. 21-25, 2007, pp. 2861-2864.

Fukui, N.; Study of Channel Quality Feedback in UMTS HSDPA; Personal, Indoor and Mobile Radio Communication, 2003. PIMRC 2003. 14$^{th}$ IEEE International Symposium on, vol. 1, pp. 336-340, Sep. 7-10, 2003.

Dottling et al.; Efficient Channel Quality Feedback Schemes for Adaptive Modulation and Coding of Packet Data, Vehicular Technology Conference, 2004. VTC2004-Fall. 2004 IEEE 60$^{th}$, vol. 2, pp. 1243-1247, Sep. 26-29, 2004.

Soo-Yong et al.; Channel Adaptive CQI Reporting Schemes for UMTS High-Speed Downlink Packet Access, Vehicular Technology Conference, 2006. VTC2006-Fall. 2006 IEEE 64$^{th}$, p. 1-5, Sep. 25-28, 2006.

LG Electronics Inc.: Uplink Scheduling for VoIP, 3GPP TSG RAN WG2 # 56, R2-063273, Nov. 6-10, 2006, pp. 1-3, XP002460797, Riga, Latvia.

Samsung; VoIP Support in LTE, 3GPP TSG RAN WG1 Meeting #48, R1-070961, Feb. 12-16, 2007, pp. 1-6, XP002460796, St. Louis, Missouri.

Lucent Technologies; Uplink Scheduling Requests for Real Time Services, 3GPP TSG-RAN2, #54, R2-062227, Aug. 28-Sep. 1, 2006, pp. 1-5, XP002460798.

NTT Docomo, Inc.; Comparison of Persistent Resource Alocation Schemes in LTE Uplink, 3GPP TSG RAN WG2 #56, R2-060283, Jan. 15-19, 2007, pp. 1-5, XP002460799, Riga Litvia.

Alcatel-Lucent; DL Control Signaling and Multiplexing for VoIP, 3GPP TSG RAN WG1 Meeting #48bis, R1-071721, Mar. 26-30, 2007, pp. 1-4, XP002460800, St. Julians, Malta.

NTT Docomo, Inc.; Uplink Resource Allocation Scheme, 3GPP TSG RAN WG2 #54, R2-062164, Aug. 28-Sep. 1, 2006, pp. 1-5, XP002460801, Tallinn, Estonia.

Ericsson et al., "Maximum number of hybrid ARQ processes", TSG-RAN WG1 #50, R1-073871, Aug. 20-24, 2007.

Ericsson, "DRX control for LTE_ACTIVE and VoIP", 3GPP TSG-RAN WG2 Meeting #58, R2-071818, May 7-11, 2007, Kobe, Japan.

Nokia Siemens Networks, "Update on Security, System Information, Mobility, MBMS and DRX", 3GPP TSG-RAN2 Meeting #59, R2-073855, Jun. 20-24, 2007, Athens, Greece.

European Search Report dated Sep. 12, 2007 based on EP 07 10 7587.

European Search Report dated Dec. 20, 2007 based on EP 07 10 8885.

PCT Search Report dated Apr. 17, 2008 based on PCT/CA2007/002368.

PCT Search Report dated Apr. 17, 2008 based on PCT/CA2008/000003.

PCT Search Report dated Mar. 13, 2008 based on PCT/CA2007/002311.

PCT Search Report dated May 21, 2008 based on PCT/CA2007/002299.

PCT Search Report dated Apr. 24, 2008 based on PCT/CA2008/000001.

PCT Search Report dated Aug. 8, 2008 based on PCT/CA2008/000770.

PCT Search Report dated Aug. 1, 2008 based on PCT/CA2008/000771.

PCT Search Report dated Feb. 28, 2009 based on PCT/US2008/073593.

European Search Report dated Dec. 16, 2008 based on EP 08 16 2639.

PCT Search Report dated Feb. 6, 2009 based on PCT/US2008/073585.

European Search Report dated Dec. 16, 2008 based on EP 08 16 2615.

PCT Search Report dated Dec. 26, 2008 based on PCT/US2008/073580.

European Search Report dated Nov. 25, 2008 based on EP 08 162 638.

Ericsson: "DRX and VoIP" 3rd Generation Partnership Project (3GPP), [Online] Aug. 15, 2007, XP050135937 Retrieved from the Internet: URL:ftp://ftp.3gpp.org/tsg_ran/WG2_RL2/TSG R2_59/Docs/R2-073208.zip>.

European Examination Report dated Feb. 9, 2010 for European Patent Application No. 08162615.2.

* cited by examiner

SYSTEM AND METHOD FOR RETRANSMISSIONS IN A DISCONTINUOUS RECEPTION CONFIGURED SYSTEM

RELATED APPLICATIONS

This application claims the benefit of U.S. Provisional Application Ser. No. 60/956,845 filed on Aug. 20, 2007, and U.S. Provisional Application Ser. No. 60/974,653 filed on Sep. 24, 2007 which are incorporated herein by reference in their entirety.

FIELD OF THE APPLICATION

The application relates to wireless communication, and more particularly to retransmissions in respect of communication using a semi-persistent resource.

BACKGROUND

With semi-persistent scheduling, for downlink VoIP (voice over IP (Internet Protocol)) communications to a mobile device, a periodic DL (downlink) transmission resource is allocated during a talk-spurt on the downlink. The same resource is allocated each time. The allocation is turned on during each of the talk-spurts and off between talk-spurts. In this manner, explicit signaling to request an allocation and to grant a particular VoIP allocation is not required. Semi-persistent scheduling for uplink VoIP communications from a mobile station is similar.

In addition to regular VoIP traffic, mobile devices also need the ability to send and transmit larger IP packets. Such larger IP packets are likely to be relatively infrequent compared to the frequency of regular VoIP transmissions. Such packets might include uncompressed IP packets, RTCP (Remote Transmit Power Control) packets, SIP/SDP (Session Initiation Protocol/Session Description Protocol) packets, etc. Such IP packets may be several hundreds of bytes in size and may have high priority. In addition, larger packets may be required to transmit RRC (Radio Resource Control) Signaling messages. Examples of this are handover related messages such as measurement reports. Some mobile devices will also need the ability to deliver a mixed service in which case services in addition to VoIP need to be provided to the mobile device, such as e-mail, web browsing etc.

BRIEF DESCRIPTION OF THE DRAWINGS

Embodiments will now be described with reference to the attached drawings in which.

DETAILED DESCRIPTION OF EMBODIMENTS

Figure 1:
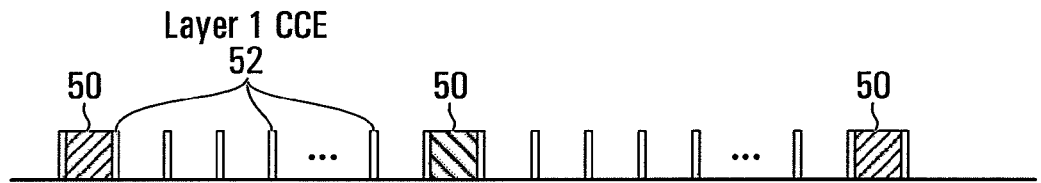
FIG. 1 is a signaling diagram showing dynamic scheduling vs. semi-persistent scheduling.

According to one broad aspect, the application provides a method in a wireless device comprising: configuring the device for discontinuous reception (DRX) having on durations; receiving a first transmission during an on duration; if the first transmission was not successfully received sending a negative acknowledgement (NACK) and entering an additional on-duration based upon a hybrid automatic repeat request (HARQ) round-trip time (RTT).

According to another broad aspect, the application provides a wireless device comprising: a radio configured for discontinuous reception (DRX) having on durations; the radio further configured to receive a first transmission during an on duration; and a radio manager configured to command the radio to enter an additional on-duration based upon a hybrid automatic repeat request (HARQ) round-trip time (RTT) if the first transmission was not successfully received.

According to another broad aspect, the application provides a method in a wireless device comprising: controlling at least one of a transmitter and a receiver to have on periods of nominal on duration during which at least one of the transmitter and the receiver is on; communicating during at least one of the periods of nominal on duration; controlling at least one of the transmitter and receiver to be on for an additional on period upon determining there will be a retransmission in respect of a communication during one of said on periods of nominal on duration.

According to another broad aspect, the application provides a computer readable medium having computer readable instructions stored thereon that when executed by a wireless device having a transmitter and a receiver implement a method comprising: controlling at least one of the transmitter and the receiver to have on periods of nominal on duration during which at least one of the transmitter and the receiver is on; controlling at least one of the transmitter and receiver to be on for an additional on period upon determining there will be a retransmission.

According to another broad aspect, the application provides a method in a wireless network for communicating with a mobile device, the method comprising: transmitting signaling that defines on periods each having a nominal on duration, such that the mobile device will be expected to have at least one of a receiver and transmitter in the mobile device on for every on period; and transmitting signaling that defines additional on periods for the mobile device for retransmissions, such that the mobile device will be expected to have the at least one of the receiver and transmitter on for each additional on period for which a retransmission is expected.

According to another broad aspect, the application provides a computer readable medium having computer readable instructions stored thereon that when executed by a wireless network control the network to implement a method for communicating with a mobile device, the method comprising: transmitting signaling that defines on periods each having a nominal on duration, such that the mobile device will be expected to have at least one of a receiver and transmitter in the mobile device on for every on period; and transmitting signaling that defines additional on periods for the mobile device for retransmissions, such that the mobile device will be expected to have at least one of the receiver and transmitter of the radio on for each additional on period for which a retransmission is expected.

According to another broad aspect, the application provides an apparatus for providing communications services to a mobile device, the apparatus comprising: a discontinuous reception controller that determines discontinuous reception control parameters for a mobile device, the discontinuous reception control parameters indicating on periods during which the mobile device will nominally have at least one of a transmitter and receiver in the mobile device powered on, the discontinuous reception control parameters further indicating additional on periods during which the mobile device will have at least one of the transmitter and receiver powered on for the purpose of retransmission in the event a retransmission is expected; a transceiver and at least one antenna for establishing a wireless link with the mobile device, the transceiver being used to transmit the discontinuous reception control parameters to the mobile device and to communicate with the mobile device in accordance with the discontinuous reception control parameters.

According to another broad aspect, the application provides a mobile device comprising: a wireless access radio for sending and receiving wireless communications to and from a network; a radio manager that controls when the wireless access radio is on and when the wireless access radio is off; the radio manager configured to perform control of the wireless access radio in accordance with discontinuous reception control parameters received from the network via the wireless access radio, the discontinuous reception control parameters indicating on periods of nominal on duration during which the wireless access radio will nominally be powered on; the radio manager further configured to control the wireless access radio to be on for an additional on period upon determining a retransmission is expected.

Further aspects provide wireless networks, base stations, wireless devices that execute one or more of the methods summarized above or detailed herein. Another embodiment provides a computer readable medium having computer readable instructions for controlling the execution of one or more of the methods summarized above or detailed herein.

Dynamic scheduling has been proposed to allow the dynamic allocation of transmission resources, and the subsequent transmission of a large packet using the dynamically allocated resources. Dynamic scheduling involves allocating a resource each time a packet is to be transmitted, and the resource can differ for each allocation. In a particular example, see Applicant's co-pending U.S. Provisional Patent Application No. 60/944,376 filed on Jun. 15, 2007 and hereby incorporated by reference in its entirety.

In a specific example, a mobile device supporting VoIP with dynamic scheduling monitors layer 1 CCEs (Control Channel Elements) continuously for dynamic scheduling grants even though the mobile device might be only involved in a VoIP session. LTE (Long Term Evolution) refers to CCEs, but the term has more general application to mean simply control information.

As indicated above, a mobile device may support VoIP with dynamic scheduling by monitoring layer 1 CCEs continuously for dynamic scheduling grants. Unfortunately, this might waste battery power for the mobile device, particularly when there are very few or even no dynamic scheduling grants for the mobile device.

Referring now to FIG. 1, shown is a signaling diagram showing dynamic scheduling vs. semi-persistent scheduling. Time is on the horizontal axis. Shown is a periodic semi-persistent allocation 50. For VoIP transmission, this can for example include a resource allocated every 20 ms. In addition, there is a regular set of layer 1 CCEs 52 that are transmitted. In the illustrated example, these are transmitted every 1 ms but it is to be clearly understood that the other resource allocation periods and CCE periods are possible. This example assumes downlink transmission, but a similar approach applies to uplink transmission. During the periods that occur between talk-spurts, (also referred to as "silence" or "silence periods"), the transmitter and receiver can be turned off. During a talk-spurt period (also referred to as a period that VoIP transmission is "active", or "active mode"), if not for dynamic scheduling, the mobile device could wake up regularly to blind-detect its data in the semi-persistently allocated resource at the pre-defined interval (e.g. every 20 ms) while entering a "sleeping" mode at other times. This can also be referred to as DRX (discontinuous reception). This simply means that the receive capability of the mobile device's radio is basically turned off while the mobile device is in sleep mode thereby resulting in battery life extension. However, given that other data may arrive via dynamic scheduling by any of the CCEs 52, the mobile device needs to monitor the CCEs of all sub-frames. In the full dynamic scheduling case there is no DTX or DRX and the mobile device needs to continue monitoring the layer 1 CCEs for dynamic scheduling grants for possible data coming. This is not power efficient and leads to lower battery charge lifetimes.

To efficiently support the DRX in VoIP active mode in order to reduce the battery power consumption, systems and methods are provided for combining semi-persistent scheduling for VoIP with a scheduling capability for additional packet transmission. These methods are particularly effective for a mobile device that is only involved in a VoIP session (i.e. not requiring mixed service).

System for Semi-Persistent Scheduling and DRX Control

Figure 2:
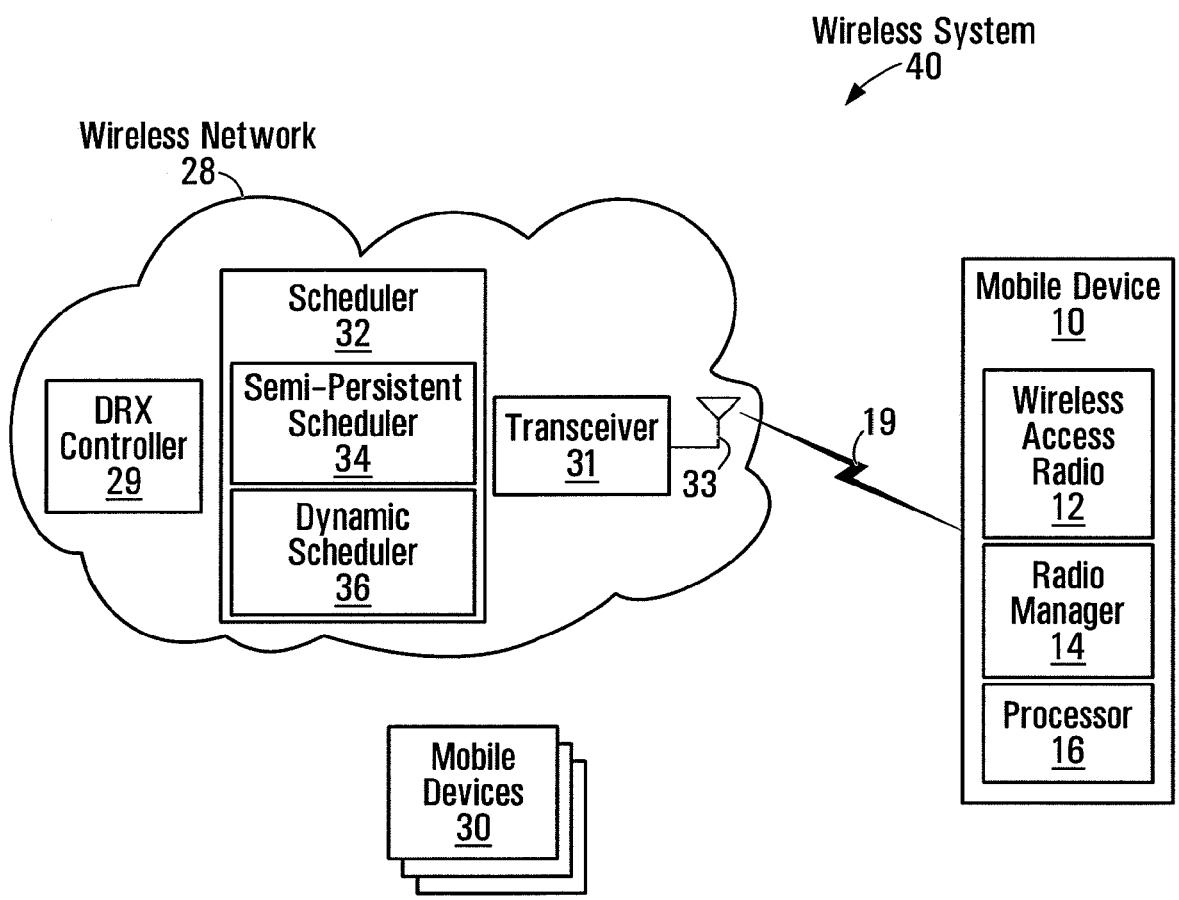
FIG. 2 is a block diagram of an example wireless system.

Referring now to FIG. 2, shown is a block diagram of an example wireless system 40. The wireless system 40 has a wireless network 28 and a mobile device 10. The wireless system also has other mobile devices 30.

The mobile device 10 has a wireless access radio 12, a processor 16 and a radio manager 14 that is responsible for controlling the wireless access radio 12. There may be additional components not shown. The radio manager 14 may be implemented in software running on appropriate hardware, hardware, firmware or combinations thereof. In some embodiments, in the radio manager 14 performs DRX control as described herein, and may also perform radio resource control and radio resource management. For example, the radio manager may perform one or more of radio resource assignment, radio bearer control, radio related signaling, mobility, measurement, paging, among other functions.

The wireless network 28 has a scheduler 32 that encompasses a semi-persistent scheduler 34 and a dynamic scheduler 36. The wireless network 28 has components such as base stations (not shown) for providing wireless access. These include a transceiver 31 having at least one antenna 33. The scheduler 32 may reside in a base station or elsewhere in the network 28. In LTE, the scheduler is typically in the eNB (enhanced NodeB). In the examples that follow, it is assumed that scheduler 32, transceiver 31 and antenna 33 are all parts of a base station. Also shown is a DRX controller 29 that is responsible for setting up/configuring/obtaining knowledge of the DRX behaviour for each mobile device. The DRX controller 29 may be part of a base station and may be implemented in software running on appropriate hardware, hardware, firmware or combinations thereof.

Furthermore, it is to be understood that the wireless network would have any appropriate components suitable for a wireless network 28. Note that the wireless network may include wires that interconnect network components in addition to components for providing wireless communication with mobile devices. The components of the wireless network are implementation specific and may depend on the type of wireless network. There are many possibilities for the wireless network. The wireless network might for example be a UMTS network or any cellular network that uses semi-persistent resource assignment.

In operation, the mobile device 10 communicates with the wireless network 28 over a wireless connection 19 between the mobile device 10 and the wireless network 28. The communication with the wireless network 28 includes VoIP packet transmission and additional packet transmission. The semi-persistent scheduler 34 is responsible for making an initial resource allocation for a VoIP service to the mobile device 10. This includes an uplink semi-persistent allocation and a downlink semi-persistent allocation. The semi-persistent scheduler 34 is also responsible for keeping track of whether there is a talk-spurt in progress for the uplink and/or the downlink and for turning on and off the uplink and/or downlink allocation accordingly. While de-allocated, the semi-persistently allocated resources can be made available for other purposes. Note that the form of the transmission resources that are being allocated is implementation specific. Particular examples of resources that might be used include OFDM resources and CDMA resources. The dynamic scheduler 36 is responsible for making resource allocations for additional packet transmissions that are not accommodated by the semi-persistent allocation. The additional packets may be related to and/or form part of the VoIP service, or be unrelated to the VoIP service.

The radio manager 14 controls the on/off state of the wireless access radio 12. In some wireless access radios, the transmitter and receiver must be turned on and off together, and as such, uplink and downlink scheduling must be coordinated to allow the wireless access radio to be turned off. In some wireless access radios, receive and transmit capabilities can be independently turned off. Note that power consumption for the transmitter is only an issue while there is an actual transmission in progress. This is in contrast to the receiver, where so long as the receiver is on, the receiver is consuming power.

In some embodiments, the network 28 sends DRX control signaling to the mobile device 10 that sets a repeating pattern that has a DRX period having an awake period and a sleep period. For some embodiments, the awake period defined by the DRX control signaling has a nominal on duration. This means that in the normal course of events, the radio will be on for a period equal to the nominal on duration and then it will be off. However, this is subject to override/exception. For example, in the embodiments described below, the radio is kept on/turned on for additional time to allow for retransmissions. In a specific example, an overall DRX period is 20 ms with sleep period equal to 15 ms and awake period equal to 5 ms. During the awake period, the mobile device turns its receiver on. During the sleep period, the mobile device turns its receiver off. This signaling might be sent at the start of each VoIP session, for example. In some embodiments, the DRX controller 29 transmits DRX control parameters to the mobile device to set up DRX control. In addition, in some embodiments the DRX control parameters include parameters that define how the radio manager 14 of the mobile device 10 should control its wireless access radio 12 for the purpose of retransmissions. Specific examples are provided below under the heading "Adaptive DRX for Retransmissions of DL VoIP." These parameters may indicate, for example, a duration of an extension to a period of nominal on duration that is to be used when a retransmission is required in respect of a transmission on a semi-persistent transmission, or an indication of extra on periods that are utilized when there is a need for a retransmission.

In some embodiments, in addition to the above-discussed DRX control functions, the DRX controller 29 performs radio resource control and radio resource management, which take care of one or more of radio resource assignment/release/reassignment, radio bearer control, admission control, radio related signaling, mobility, measurement, and paging, to name a few specific examples.

In the mobile device 10, the wireless access radio 12 receives wireless communications from the network 28. The radio manager 14 controls when the wireless access radio 12 is on and when the wireless access radio is off in accordance with DRX control parameters received from the network. Specific detailed examples are provided below. In addition, the radio manager 14 is further configured to control the wireless access radio for the purpose of retransmissions as introduced briefly above, and as detailed below under the heading "Adaptive DRX for Retransmissions of DL VoIP."

Figure 3:
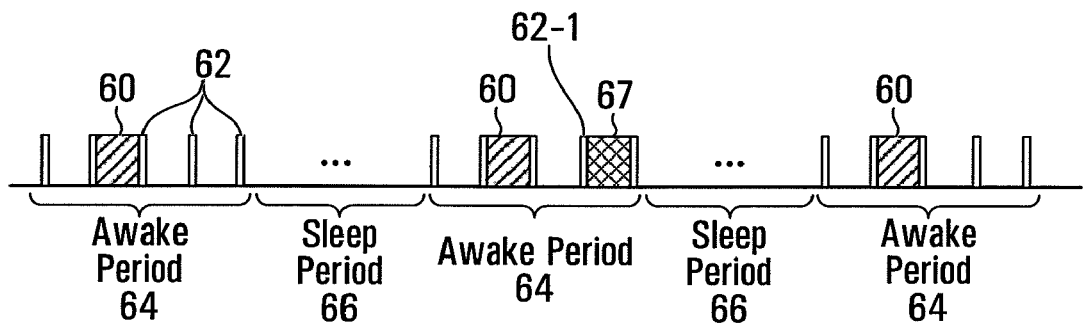
FIG. 3 is a signaling diagram showing an awake period for dynamic scheduling in DRX (discontinuous reception)

Referring now to FIG. 3, shown is a signaling diagram showing an example of semi-persistent and dynamic scheduling and DRX. Shown is a semi-persistent allocation 60 available for semi-persistent VoIP DL transmissions. In addition, there are layer 1 CCEs 62 for signaling dynamic allocations so as to allow the transmission of additional packets. This represents the transmissions from the base station. The mobile device receiving the transmissions alternates between being in an awake state and a sleep state. The mobile station is in an awake state during awake periods 64 and the mobile device is nominally in a sleep state during sleep periods 66. The first thing that the scheduler in the network needs to do is to ensure that the semi-persistent allocation 60 coincides with the awake periods 64. In addition, each awake period 64 is longer than the minimum necessary to transmit the VoIP semi-persistent allocation. There is also the opportunity to dynamically schedule (as signalled on one of the CCEs 62) and transmit an additional packet. An example of this is shown where a dynamic allocation is signalled in CCE 62-1. Additional packet 67 is shown transmitted immediately following CCE 62-1. The additional packet might for example be an RTCP packet, SIP/SDP packet, or a packet that has not undergone IP/UDP/RTP (Internet Protocol/User Datagram Protocol/Radio Transmission Protocol) header compression, etc. While the mobile device is in the sleep state, it operates in a reduced power consumption mode, by turning off reception capability and/or by turning off its reception and transmission capabilities. In this example, the network has scheduled the additional packet 67 to be transmitted during one of the awake periods 64, and signals this using a CCE 62-1 that is transmitted during one of the awake periods 64. More generally, when the mobile device wakes up after a sleep period, the mobile device will not only blind detect its own VoIP data on the semi-persistently allocated resource 60, but also will detect, more generally attempt to detect, all the CCEs during the awake periods.

In some embodiments, after the mobile device determines that there will be a dynamically allocated resource for the mobile device as signalled in one of the CCEs in a given awake period, the mobile device does not monitor further CCEs during that awake period.

In some embodiments, the base station will transmit signaling to configure the mobile device with this DRX behaviour, and thereafter all the dynamic scheduling will occur only in this "awake period". For example, the mobile device may sleep every 15 ms, and then wake up for 5 ms to continuously receive data. The behaviour repeats with a period of 20 ms. During the 5 ms awake period, the mobile device will blind-detect its VoIP data on the semi-persistently allocated resource and also the mobile device will monitor all the CCEs. The base station understands this DRX configuration and will schedule the associated dynamic packets such as RTCP, SIP/SDP, etc., during this 5 ms awake period.

The radio manager 14 controls the operation of the wireless access radio 12 such that a reception capability is powered on during the awake periods, and off for at least some of the sleep periods. As described below, it may be necessary for the reception capability to be on during some of the sleep periods to allow for retransmissions.

The signaling for dynamic scheduling is performed during the awake periods. In addition, the actual resources allocated for the additional packet transmissions are scheduled to occur during the awake periods.

Further, in some embodiments, if a mixed service needs to be provided to the mobile device, this is used as a trigger to also enable the continuous mode operation. This trigger may be dependent on the traffic QoS of the service being added.

Uplink Semi-Persistent Alignment with Downlink for DRX

Figure 4:
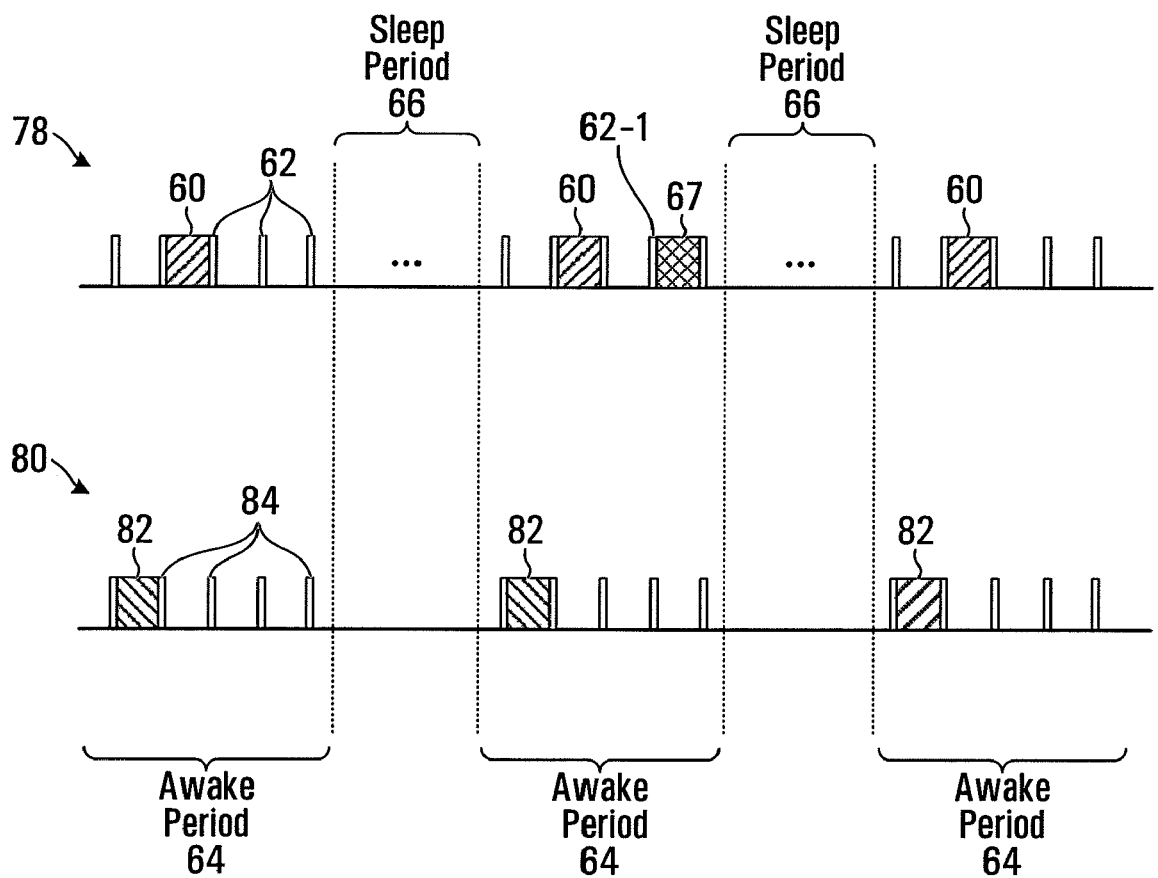
FIG. 4 is a signaling diagram showing DRX and DTX (discontinuous transmission) for uplink and downlink.

The above discussion is focused on downlink transmission from the base station to the mobile device and on the mobile device's ability to turn off its reception capability during the sleep period. However, some mobile devices are not able to turn off only their reception capability while leaving on a transmit capability or vice versa. Thus, for such devices in order to fully realize the benefit of having an awake period and a sleep period for reception, uplink transmissions should also be scheduled to align with these awake periods and sleep periods. An example of this is shown in FIG. 4. In FIG. 4, the downlink transmission is indicated at 78 and this is basically the same as that described above with reference to FIG. 3, and this will not be described again. The uplink transmissions are generally indicated at 80. Here, there is a semi-persistent allocation 82 for VoIP UL transmissions. These are scheduled to occur during the periods 64 that the mobile device is awake. In addition, an uplink control channel is indicated at 84. In the illustrated example, this occurs every 1 ms. The mobile device only transmits the uplink control channel during the awake periods 64. The mobile device can use the uplink control channel to make requests for additional resources. By scheduling the uplink semi-persistent transmission and downlink semi-persistent transmission to occur during the same awake period, the mobile device can realize much more efficient DRX and DTX (discontinuous reception and discontinuous transmission) behaviour. In the example of FIG. 4, the mobile device is configured to sleep every 15 ms, and then wake up for 5 ms. During this 5 ms awake period, the mobile device will receive DL semi-persistent reception if available (during a DL talk-spurt) and make an uplink semi-persistent transmission if available (during an UL talk-spurt). The mobile device will also detect all the DL grants and possibly make uplink additional resource requests.

Note that both the uplink and downlink VoIP semi-persistent allocations have the same traffic characteristics (every 20 ms), hence the base station can easily align the semi-persistent allocation for the DL and UL.

With this approach, even in the active mode (talk-spurt in progress on the uplink or the downlink), the mobile device can be in DRX and DTX mode most of the time. The mobile device monitors the Layer 1 CCEs on the downlink only during the awake period, and may request more resources on the uplink. This can save battery power for the mobile device. Considering that an additional IP packet delivery during a VoIP session may be infrequent, the battery saving could be significant. A drawback is that the dynamic scheduling could be delayed by an additional 10 ms on average.

Figure 5:
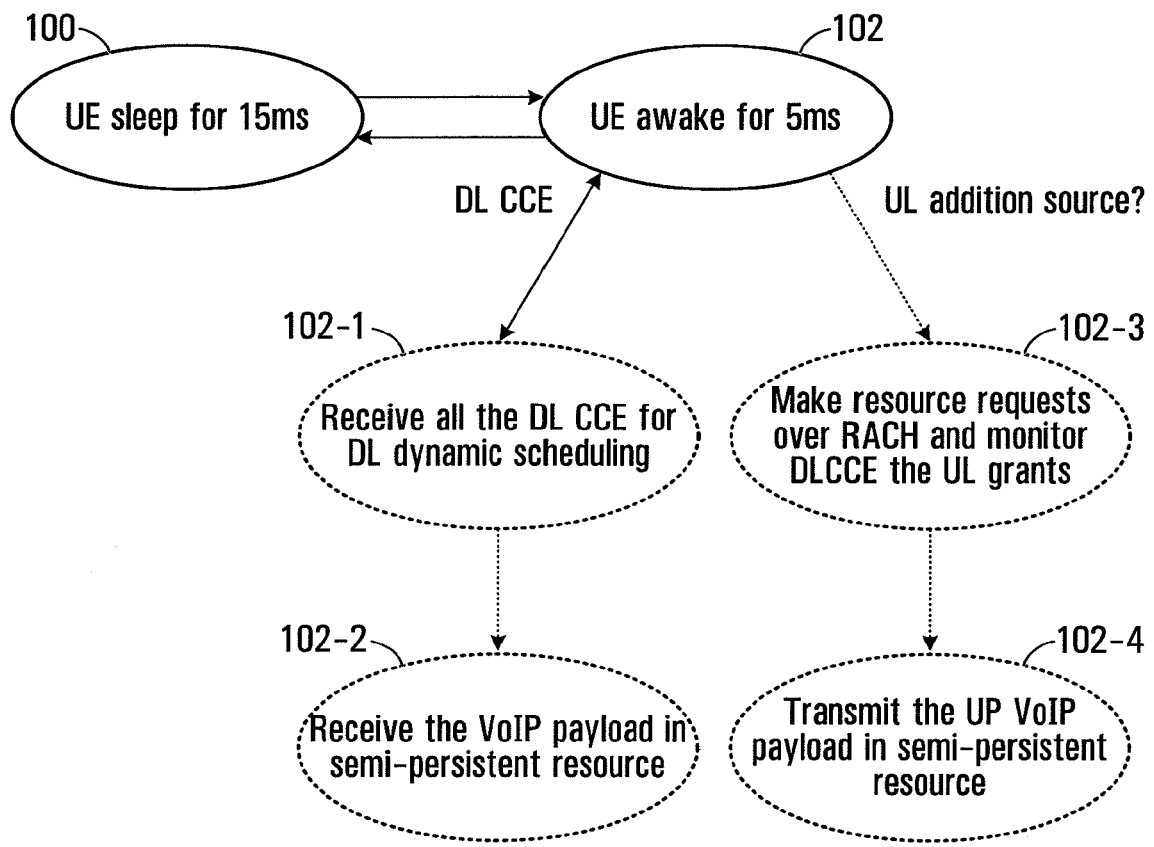
FIG. 5 is a state diagram having DRX and DTX transitions for VoIP.

Referring now to FIG. 5, shown is a state diagram having DRX/DTX state transitions for VoIP. It is noted that when there is no uplink and downlink transmission (i.e. silence in both directions), the mobile device only needs to monitor the DL CCEs for dynamic scheduling during the awake period. There are two main states. The first main state is the UE sleep state 100 and the second main state is the UE awake state 102. For the illustrated example, it is assumed that the sleep state 100 lasts 15 ms and the awake state lasts 5 ms and can be extended, but this is again implementation specific. Blocks 102-1 and 102-2 illustrate actions executed by the mobile device for downlink communication during the awake state 102. At block 102-1, the mobile device receives all of the downlink CCEs and processes them to identify downlink dynamic scheduling if present. This is done irrespective of whether or not there is any downlink VoIP transmission. In the event that a downlink talk-spurt is ongoing, then the mobile device, at block 102-2, receives the VoIP payload in the semi-persistent resource. Blocks 102-3 and 102-4 illustrate actions executed by the mobile device in respect of uplink transmissions. At block 102-3, the mobile device makes a resource request, for example over a random access channel (RACH), and monitors the downlink CCE for uplink grants if the mobile device determines that it needs a dynamic allocation for uplink transmissions. In addition, if there is an uplink talk-spurt in progress, then the mobile device, at block 102-4, transmits the uplink VoIP payload in the semi-persistent resource for uplink transmission.

The above description has focused on applications where the traffic that is sent using the semi-persistent allocation is VoIP traffic. More generally, the same methods and systems can be applied to combine the transmission and scheduling of traffic of any type on a semi-persistently allocated resource with the transmission and scheduling of traffic that uses dynamic resource allocations.

In the above examples, CCEs spaced by 1 ms are used for the downlink control channel. More generally, the downlink control channel can take any form. In some embodiments, dynamic allocations for a given mobile device take place during awake periods for the mobile device. Similarly, at least in the figures, the uplink control channel has been depicted as a random access channel that is available at intervals spaced by 1 ms. More generally, the uplink control channel for requesting additional resource allocations can come in any form. In some embodiments, requests for dynamic allocations for uplink transmission from a given mobile device will need to be transmitted during awake periods for the mobile device.

In some embodiments, the additional packet is transmitted as a series of one or more sub-packets formed by segmenting the additional packet. These are subject to reassembly at the receiver.

Figure 6:
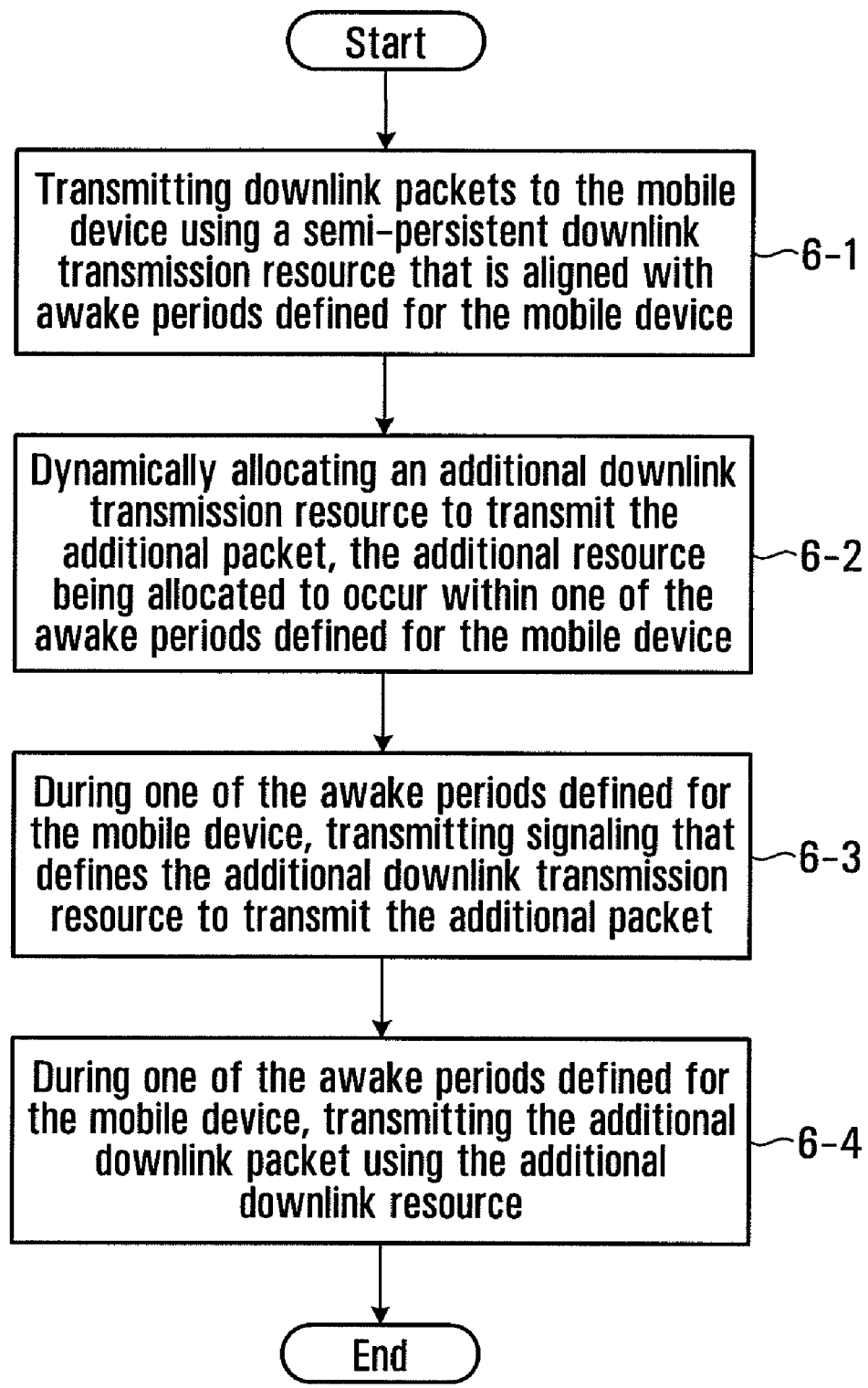
FIGS. 6 and 7 are flowcharts of methods executed by a network to perform combined semi-persistent and dynamic scheduling.

Methods for Semi-Persistent Scheduling and DRX Control Executed by the Wireless Network A method in a wireless network for performing downlink transmission to mobile devices will be described with reference to the flowchart of FIG. 6. This method is performed for each mobile device being provided wireless access on a semi-persistent downlink transmission resource. The method begins at block 6-1 with the wireless network transmitting downlink packets to the mobile device using a semi-persistent downlink transmission resource that is aligned with awake periods defined for the mobile device. These can be downlink VoIP packets during a downlink talk-spurt for a VoIP session involving the mobile device or otherwise. Blocks 6-2, 6-3, 6-4 illustrate actions executed by the wireless network for each additional downlink packet destined for the mobile device. At block 6-2, the wireless network dynamically allocates an additional downlink transmission resource to transmit the additional packet, the additional resource being allocated to occur within one of the awake periods defined for the mobile device. At block 6-3, during one of the awake periods defined for the mobile device, the wireless network transmits signaling that defines the additional downlink transmission resource to transmit the additional packet. At block 6-4, during one of the awake periods defined for the mobile device, the wireless network transmits the additional downlink packet using the additional downlink resource. In some embodiments, the method is performed in a base station. In other embodiments, certain portions of the method, for example the dynamic allocation, can be performed in another network element if centralized scheduling is performed.

Figure 7:
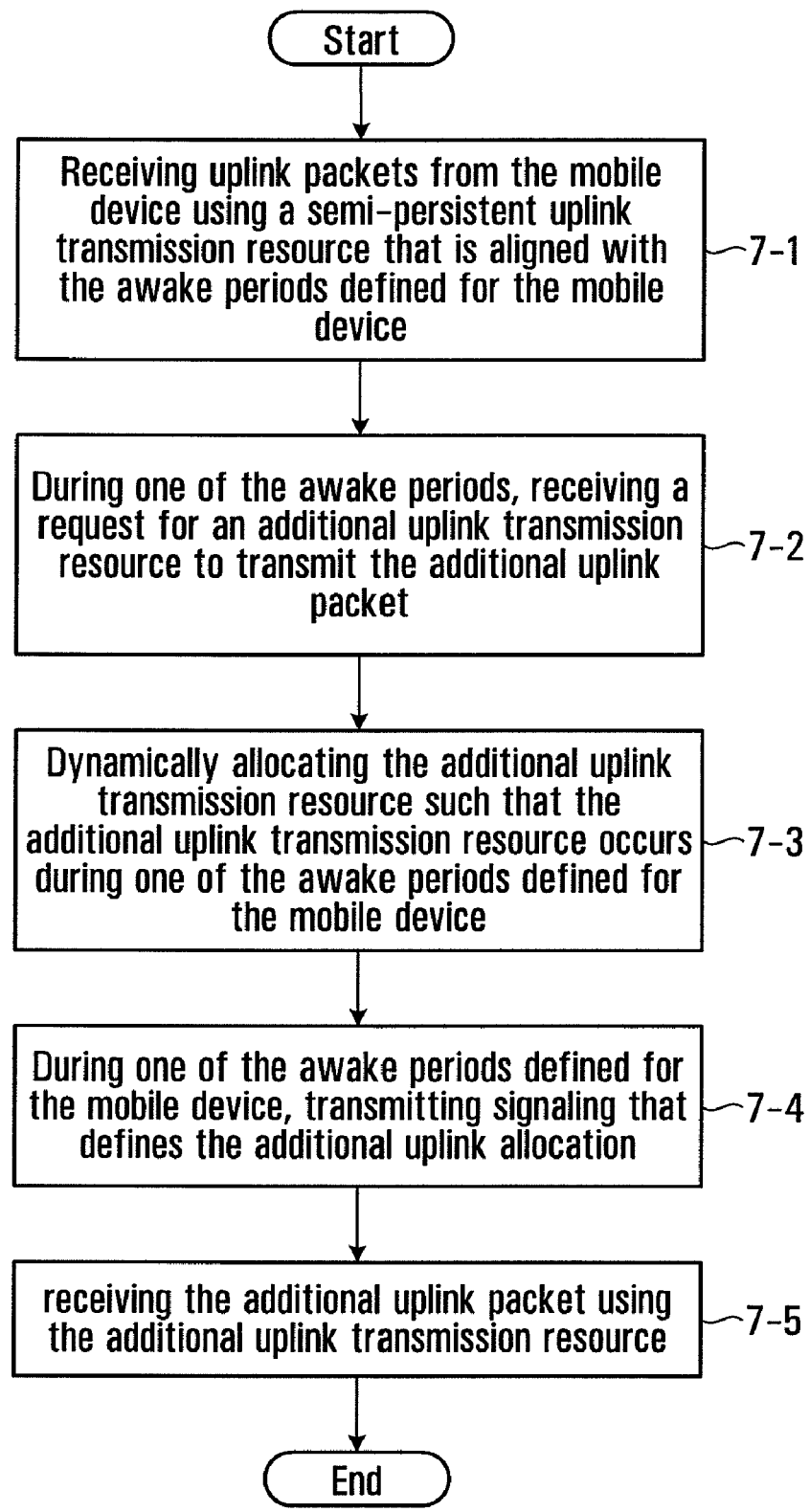

A method in a wireless network for performing uplink reception from mobile devices will be described with reference to the flowchart of FIG. 7. This method is performed for each mobile device being provided wireless access on a semi-persistent downlink transmission resource. The method begins at block 7-1 where the wireless network receives uplink packets from the mobile device using a semi-persistent uplink transmission resource that is aligned with the awake periods defined for the mobile device. These can be VoIP packets during an uplink talk-spurt for a VoIP session involving the mobile device or otherwise. Blocks 7-2, 7-3, 7-4 and 7-5 illustrate actions performed for each additional each additional uplink packet for the mobile device. At block 7-2, during one of the awake periods, the wireless network receives a request for an additional uplink transmission resource to transmit the additional uplink packet. At block 7-3, the wireless network dynamically allocates the additional uplink transmission resource such that the additional uplink transmission resource occurs during one of the awake periods defined for the mobile device. At block 7-4, during one of the awake periods defined for the mobile device, the wireless network transmits signaling that defines the additional uplink allocation. At block 7-5, the wireless network receives the additional uplink packet using the additional uplink transmission resource.

In some embodiments, the wireless network transmits signaling to each mobile device that defines the awake periods and that defines sleep periods of that mobile device and/or that defines the semi-persistent uplink and/or downlink transmission resource of that mobile device. For VoIP, the signaling to define the semi-persistent resources might be done at the start of each VoIP session. Such signaling can be performed on a channel that is dedicated to each mobile device, or using a broadcast channel containing such signaling for multiple devices.

Figure 8:
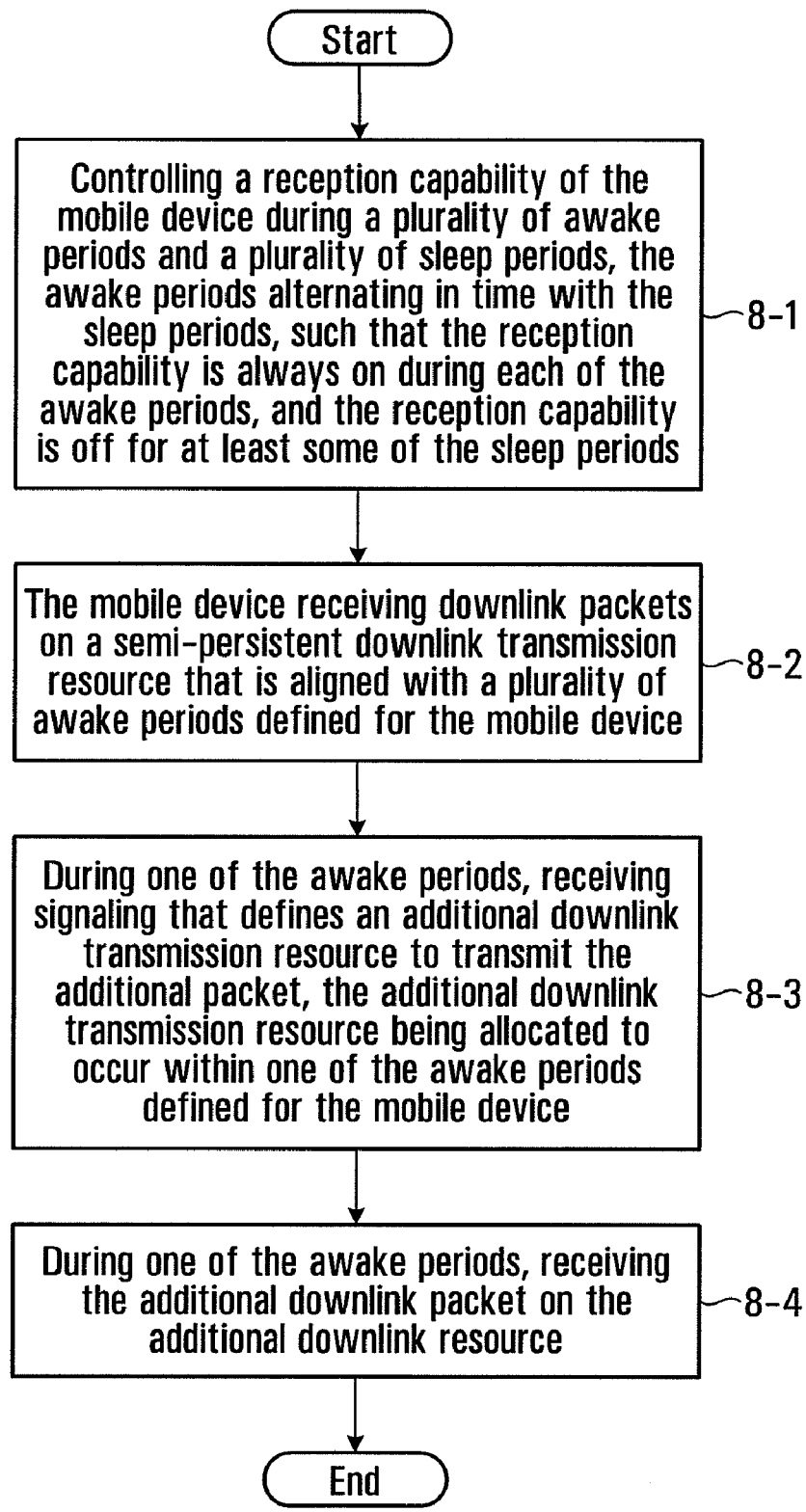
FIGS. 8 and 9 are flowcharts of methods executed by a mobile device to perform combined semi-persistent and dynamic scheduling.

Methods for Semi-Persistent Scheduling and DRX Control Executed by the Mobile Device Referring now to FIG. 8, a method of receiving downlink transmission executed by a mobile device will now be described. The method begins at block 8-1 with the mobile device controlling a reception capability of the mobile device during a plurality of awake periods and a plurality of sleep periods, the awake periods alternating in time with the sleep periods, such that the reception capability is always on during each of the awake periods, and the reception capability is off for at least some of the sleep periods. On a nominal basis, typically the reception capability will be off for every sleep period. At block 8-2, the mobile device receives downlink packets on a semi-persistent downlink transmission resource that is aligned with a plurality of awake periods defined for the mobile device. These can be VoIP downlink packets during a downlink talk-spurt for a VoIP session involving the mobile device, or otherwise. Blocks 8-3 and 8-4 illustrate actions that are performed for each additional downlink packet for the mobile device. At block 8-3, during one of the awake periods, the mobile device receives signaling that defines an additional downlink transmission resource to transmit the additional packet, the additional downlink transmission resource being allocated to occur within one of the awake periods defined for the mobile device. At block 8-4, during one of the awake periods, the mobile device receives the additional downlink packet on the additional downlink resource.

The mobile device may receive signaling that defines the awake periods and the sleep periods of the mobile device and/or that defines the semi-persistent downlink transmission resource of that mobile device. This may take place over a respective dedicated channel for the mobile device or over a broadcast channel containing signaling information for the mobile device and other mobile devices.

Figure 9:
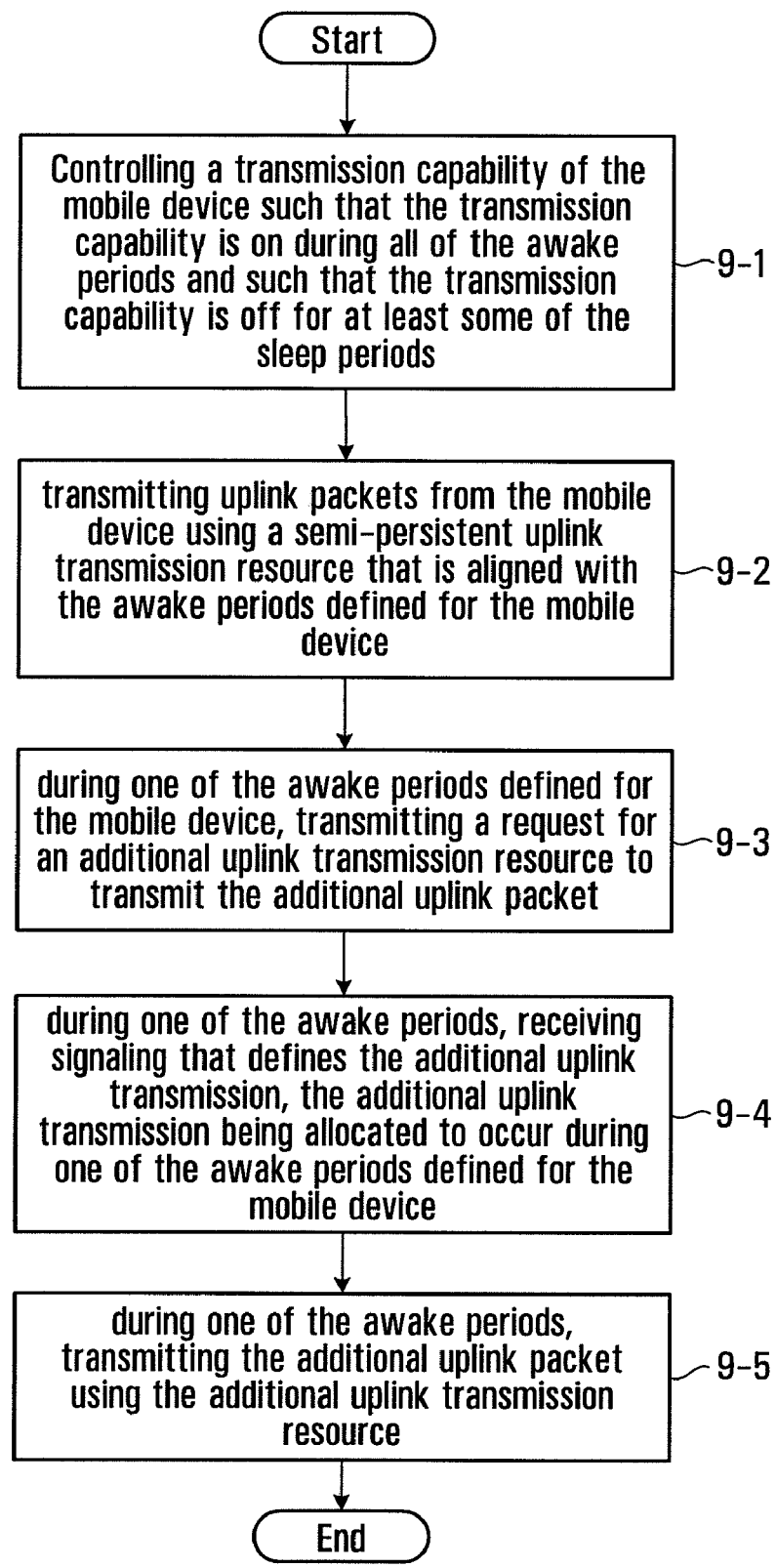

Referring now to FIG. 9, a method of transmitting uplink transmissions executed by a mobile device will now be described. The method begins at block 9-1 with controlling a transmission capability of the mobile device such that the transmission capability is on during all of the awake periods and such that the transmission capability is off for at least some of the sleep periods. At block 9-2, the mobile device transmits uplink packets (VoIP packets or otherwise) using a semi-persistent uplink transmission resource that is aligned with the awake periods defined for the mobile device. Blocks 9-3, 9-4, 9-5 illustrate actions that are executed for each additional uplink packet for the mobile device. At block 9-3, during one of the awake periods defined for the mobile device, the mobile device transmits a request for an additional uplink transmission resource to transmit the additional uplink packet. At block 9-4, during one of the awake periods, the mobile device receives signaling that defines the additional uplink transmission resource, the additional uplink transmission resource being allocated to occur during one of the awake periods defined for the mobile device. At block 9-5, during one of the awake periods, the mobile device transmits the additional uplink packet using the additional uplink transmission resource.

The mobile device may receive signaling that defines the semi-persistent uplink resource. In some embodiments, the request for an additional uplink allocation is transmitted using a contention based random access channel.

In some embodiments, mobile devices have radios that feature a transmitter and a receiver. While the radio as a whole is on, the receiver capability is on, and the receiver will be actively attempting to process signals received on the mobile device's antenna(s). There is not necessarily content for the given mobile device all the time that the receiver is on, but the receiver is consuming power nonetheless for that time period. In addition, while the radio as a whole is on, the mobile device is able to transmit. However, so long as the mobile device does not have something to transmit, there is no active transmission taking place, and as such little or no transmit power consumption occurs until there is an active transmission. In some embodiments the radio as a whole is turned on and off.

In other embodiments, the transmitter and receiver can be turned on and off independently.

In embodiments referring to negative acknowledgement (NACK)/acknowledgment (ACK) transmission, the particular NACK/ACK scheme employed is implementation specific. Some embodiments employ an ACK only scheme; other embodiments employ a NACK only scheme, while others use both ACKs and NACKs.

Adaptive DRX for Retransmissions

In some embodiments, for the downlink, an inactivity timer is started after reception of a dynamically scheduled packet during a DRX-ON period (DRX-ON period extension). The mobile device keeps its radio on until expiry of the inactivity timer unless another dynamic scheduling takes place before expiry in which case the inactivity timer is restarted. Because of the inactivity timer, there is no problem with reception of retransmissions of dynamically scheduled packets. They can simply be transmitted before the inactivity timer expires, and this will result in a corresponding restarting of the inactivity timer. However, for semi-persistent scheduling (even in systems that feature an inactivity timer as described above), the mobile device will not start an inactivity timer after receiving a downlink transmission on a semi-persistent resource, but rather the mobile device will go to sleep at the end of an on period. In the absence of some other mechanism to handle retransmissions, a retransmission to the mobile device will not happen until the next pre-defined on period.

If a 10-15% FER (frame error rate) is assumed for the initial transmission, then most of the time, no retransmission is needed for voice services. Further embodiments provide methods for retransmission handling for the voice frames that take advantage of this relatively low retransmission rate. More generally, the approaches described herein can be applied to retransmissions in respect of traffic on a semi-persistent resource.

In some embodiments, the sleep periods that are nominally defined (i.e. periods during which the mobile device will nominally have its radio off) are used for downlink retransmissions, and the mobile device will have its radio (more generally, at least its receiver) on in the event a retransmission is expected. This may involve keeping the radio on after the end of a normal awake period (period of nominal on duration), or turning the radio off and then on again in which case there is a gap between the period of nominal on duration and an additional on period defined for retransmission. In some embodiments, the mobile device will not be expecting dynamic allocations during such periods.

Similarly, in some embodiments, sleep periods that are nominally defined (i.e. periods during which the mobile device will nominally have its radio off) are used for uplink retransmissions, and the mobile device will have its radio (more generally, at least its transmitter) on to allow for this. This may involve keeping the radio on after the end of a period of nominal on duration, or turning the radio off and then on again in which case there is a gap between an on period of the nominal on duration and an additional on period defined for retransmission. In some embodiments, the mobile device will not be expecting dynamic allocations during such periods.

Extension to Awake Period for Retransmission

In some embodiments, one or more of the on periods of nominal on duration are followed immediately by an additional on period so as to allow for the transmission/reception of retransmissions. Effectively, this amounts to an extension of an awake period. In this case, in some embodiments the mobile device monitors for dynamic allocations during the extended periods. For example, the CCEs of the longer on periods may be made available for dynamic scheduling purposes. DRX parameters define the nominal on and off periods that are used in the absence of some reason to change, such as a retransmission.

Figure 11:
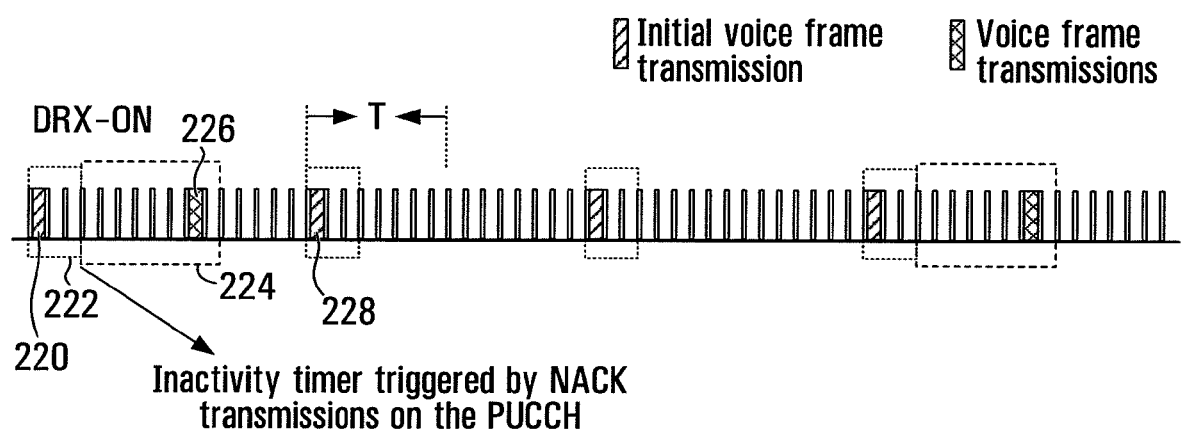
FIG. 11 is a diagram showing semi-persistent allocations for initial voice frames, and extensions to on periods for retransmissions if required.

In a specific example of this, a mobile device starts an inactivity timer after determining a retransmission is expected. This may, for example, involve starting an inactivity timer upon determining that a NACK will be transmitted, the timer having a duration selected to ensure that the retransmissions will be received. An example of this is shown in FIG. 11. In this example, an original transmission using the semi-persistent resource takes place at 220 during an on period 222. The mobile device receives this and transmits a NACK (not shown). In order to allow for a retransmission, an inactivity timer is started, with the result that the mobile device will keep its radio on for at least period 224, and during that period, the retransmission occurs at 226. In this case however, the retransmission does not trigger the restart of the inactivity timer. In some embodiments, in the event another dynamic allocation occurs during an extended on period (e.g. period 224 of FIG. 11) this restarts the inactivity timer. For packet 228, there is no need for a retransmission, and as such, the inactivity timer is not started, and the on period is not extended.

Considering a HARQ (hybrid automatic repeat request) RTT (round-trip time) for the retransmissions, a DRX repetition period T, and a FER (frame error rate) for the initial voice transmission of $\alpha$, with the approach described, the total mobile device wake up time is $t/0.02+50*\alpha*HARQ\ RTT$. This works out to approximately 50t+60 ms assuming a 15% FER, and a HARQ RTT of 8TTIs.

Figure 12:
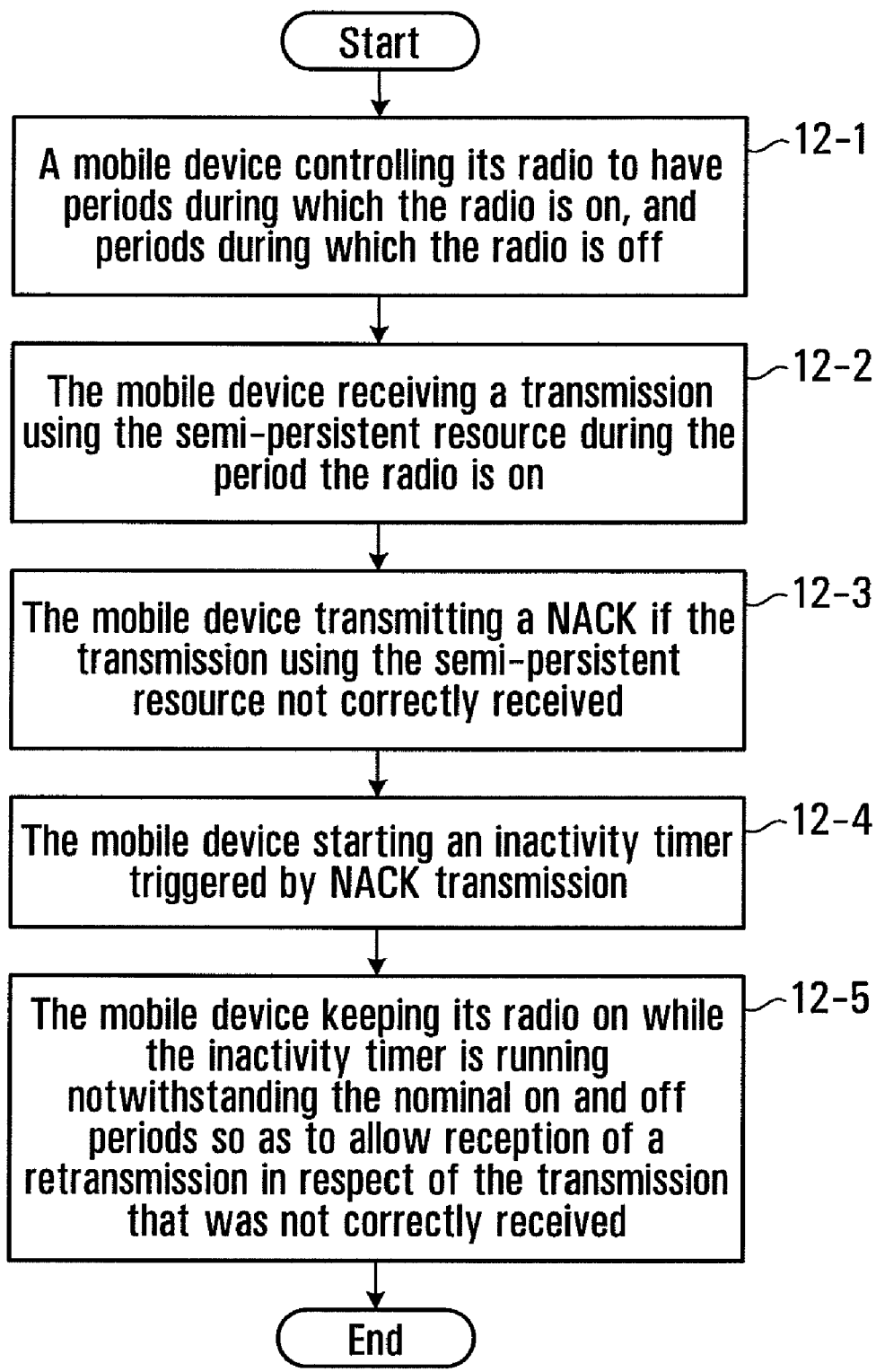
FIG. 12 is a flowchart of a method of performing discontinuous reception control to allow for retransmissions.

A flowchart of an example of such a method is shown in FIG. 12. The method begins at block 12-1 with a mobile device controlling its radio (more generally at least its receiver) to have periods during which the radio is on, and periods during which the radio is off. For each period that the radio is on for which there is content to send to the mobile device on a semi-persistent resource, the mobile device performs the actions set forth in blocks 12-2, 12-3, 12-4, and 12-5. At block 12-2, the mobile device receives a transmission using the semi-persistent resource during the period the radio is on. At block 12-3, the mobile device transmits a NACK if the transmission using the semi-persistent resource was not correctly received. At block 12-4, the mobile device starts an inactivity timer triggered by NACK transmission. At block 12-5, the mobile device keeps its radio on while the inactivity timer is running notwithstanding the nominal on and off periods so as to allow reception of a retransmission in respect of the transmission that was not correctly received.

Additional Awake Periods for Retransmissions

Figure 13:
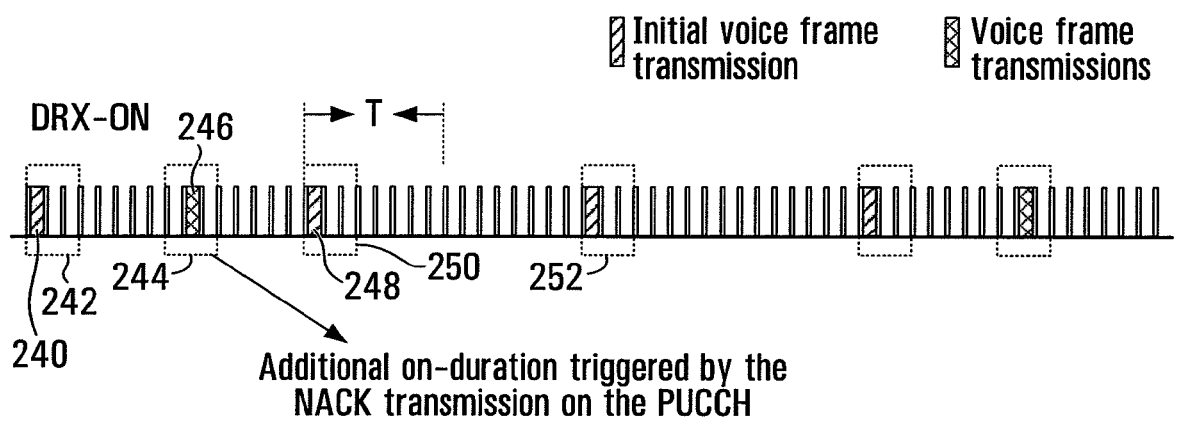
FIG. 13 is a diagram showing semi-persistent allocations for initial voice frames, and additional on periods for retransmissions if required.

In some embodiments, the additional on periods are configured for retransmissions on the uplink and/or downlink to occur after a gap following an on period of nominal on duration. In some embodiments, during these additional on periods, the UE monitors for dynamic allocations. For example the CCEs can be used to signal possible dynamic allocations. In this case, a mobile device enters sleep at the expiration of a period of nominal on duration, but in the event the mobile device transmitted a NACK, it will enter an additional on-duration which is started around the HARQ RTT. An example is shown in FIG. 13. In this example, an original transmission using the semi-persistent resource takes place at 240 during an on period 242. The mobile device receives this and transmits a NACK (not shown). In order to allow for a retransmission, an additional on period 244 is established. The base station can transmit the retransmission asynchronously any time during the additional on period 244. The retransmission is indicated at 246. For packet 248, there is no need for a retransmission, and as such, there is no additional on period between on period 250 for packet 248, and the next on period 252 for the next semi-persistent transmission.

With this approach, the total wake-up duration is t/0.02+ 50*α*t which is approximately 58t, again assuming a 15% FER, and a HARQ RTT of 8TTIs.

Figure 14:
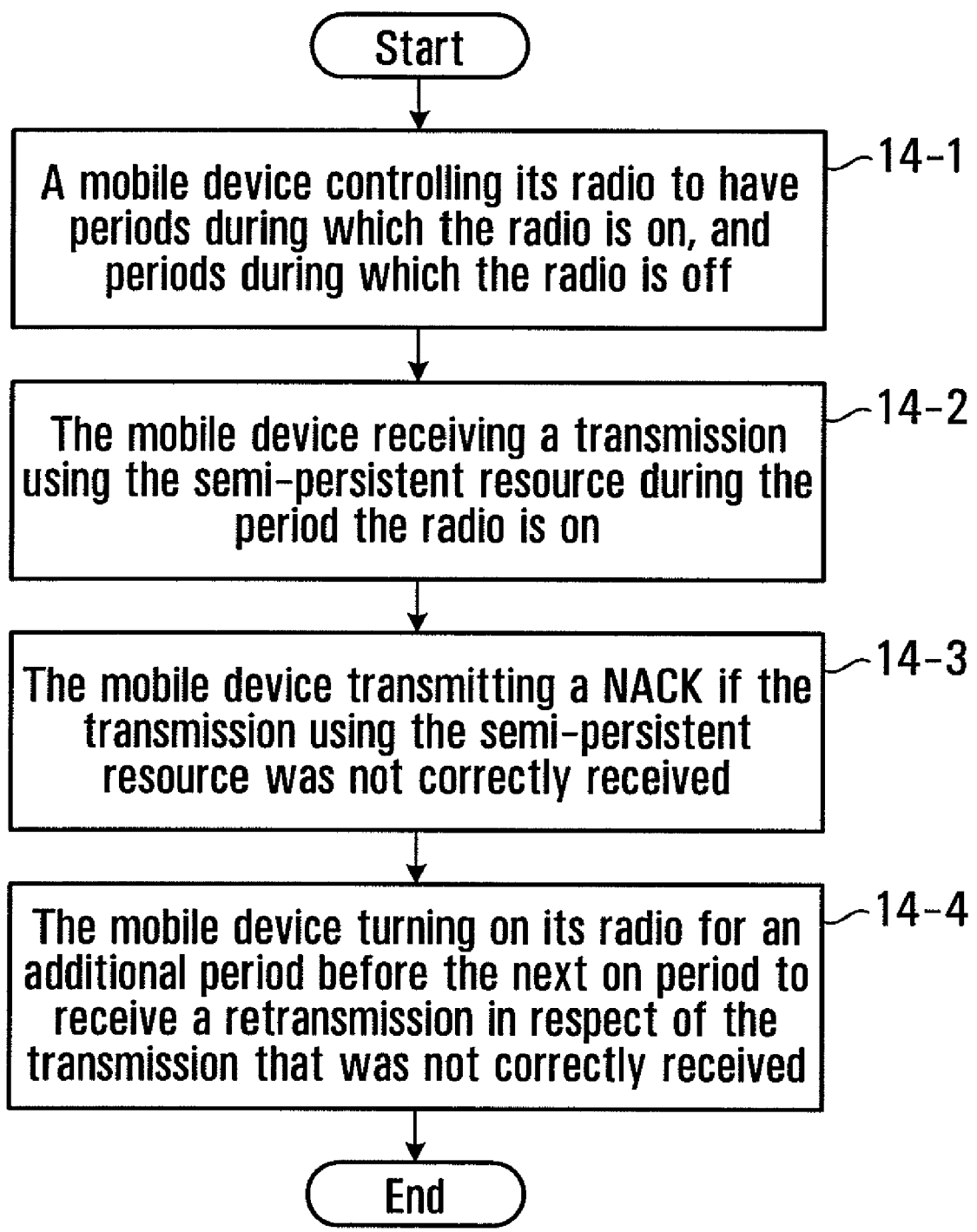
FIG. 14 is a flowchart of a method of performing discontinuous reception control to allow for retransmissions.

A flowchart of an example of such a method is shown in FIG. 14. The method begins at block 14-1 with a mobile device controlling its radio (more generally at least the receiver) to have periods during which the radio is on, and periods during which the radio is off. There will include periods of nominal on duration as detailed above. For each period that the radio is on for which there is content to send to the mobile device on a semi-persistent resource, the mobile device performs the actions set forth in blocks 14-2, 14-3 and 14-4. At block 14-2, the mobile device receives a transmission using the semi-persistent resource during the period the radio is on. At block 14-3, the mobile device transmits a NACK if the transmission using the semi-persistent resource was not correctly received. At block 14-4, the mobile device turns on its radio for an additional period before the next on nominal period to receive a retransmission in respect of the transmission that was not correctly received.

The flowcharts of FIGS. 12 and 14 are specific to communications which are transmissions on semi-persistent resources for downlink transmission to the mobile device. More generally, a similar approach can be applied to communications generally which may include uplink and/or downlink communications. When applied to uplink communications, the transmission and reception roles of the mobile device are for the most part reversed. The mobile device receives signaling that defines a nominal on duration for sending uplink transmissions on a semi-persistent resource. The mobile device controls its radio to have periods during which at least the transmitter is on, and periods during which the at least the transmitter is off. For each period that the transmitter is on for which there is content to send on a semi-persistent resource, the mobile device sends a transmission using the semi-persistent resource, and in the event a retransmission in respect of the transmission is required, the mobile device has its transmitter on for an additional on period to allow for the retransmission.

The above embodiments involving retransmission can be applied in respect of uplink or downlink communications on semi-persistent resources. A communication on a semi-persistent resource might be an uplink communication or a downlink communication. The retransmission mechanisms described herein might be implemented in respect of uplink communications, downlink communications or both.

As described above, additional on periods are defined for retransmissions. The mobile device will have its radio (more generally at least one of the receiver and transmitter) on for each such period in the event a retransmission in respect of a communication is needed. The retransmission is an uplink retransmission if the original retransmission was an uplink transmission; the retransmission is a downlink retransmission if the original retransmission was an uplink transmission.

In some embodiments, (the additional periods) immediately follow the periods of nominal on duration. This is analogous to an "extension of an on period" such as was described above by way of example with reference to FIG. 11.

In some embodiments, cases, there is a gap between the end of a period of nominal on duration, and the additional period, such as was described above by way of example with reference to FIG. 13.

The embodiments described above have focused on retransmissions in respect of communications sent using semi-persistent resources on the uplink and/or downlink. More generally, embodiments are provided for retransmissions in respect of uplink and/or downlink communications in the context of a transmitter and/or receiver having periodic on periods of nominal on duration during which communication takes place using resources that may not necessarily be semi-persistently assigned.

Another Mobile Device

Figure 10:
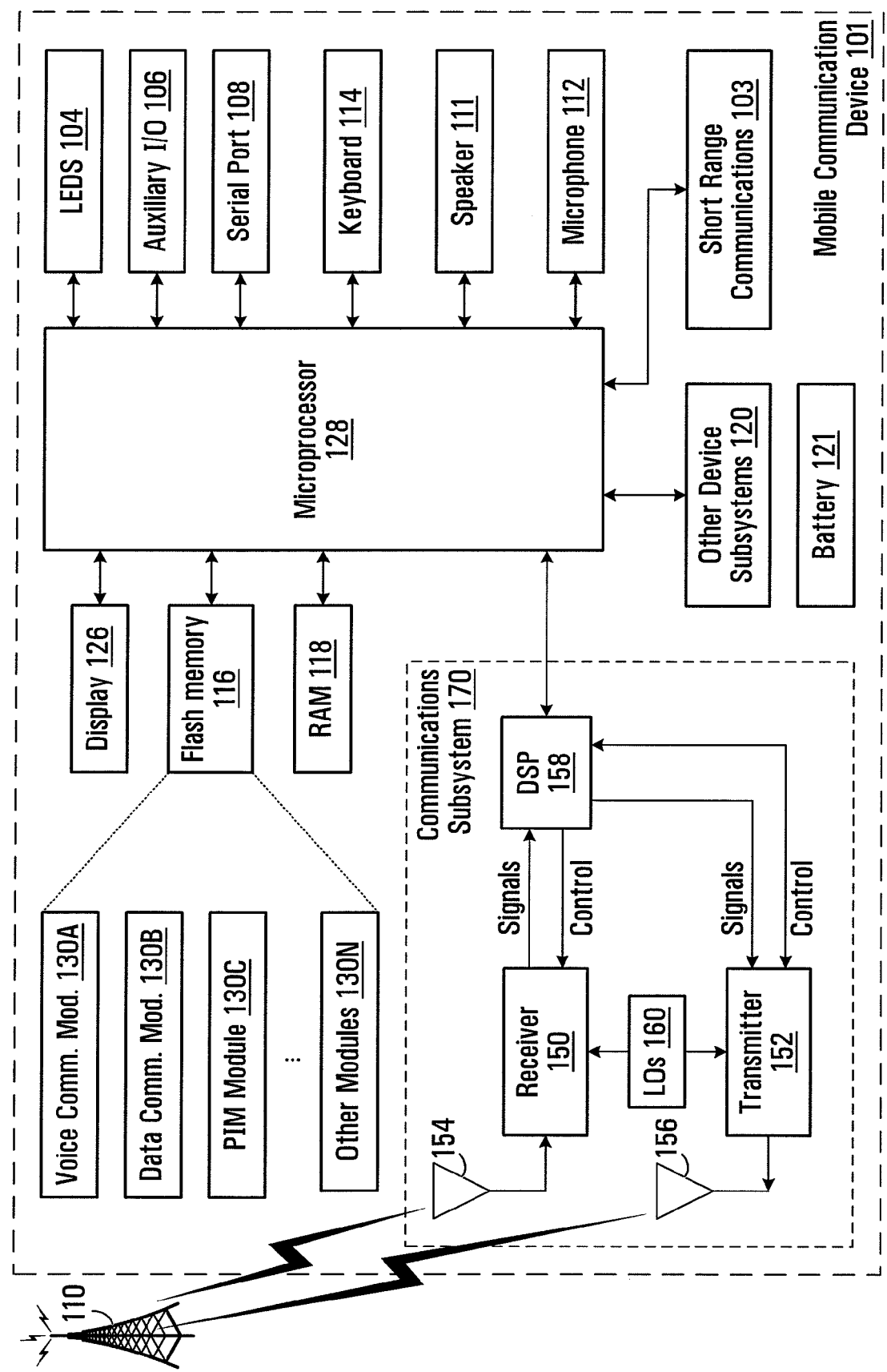
FIG. 10 is a block diagram of a mobile device.

Referring now to FIG. 10, shown is a block diagram of another mobile device that may implement any of the mobile device methods described herein. The mobile device 101 is shown with specific components for implementing features similar to those of the mobile device 10 of FIG. 2. It is to be understood that the mobile device 101 is shown with very specific details for example purposes only.

A processing device (a microprocessor 128) is shown schematically as coupled between a keyboard 114 and a display 126. The microprocessor 128 may be a specific example of the processor with features similar to those of the processor 16 of the mobile device 10 shown in FIG. 2. The microprocessor 128 controls operation of the display 126, as well as overall operation of the mobile device 101, in response to actuation of keys on the keyboard 114 by a user.

The mobile device 101 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the mobile device 101 are shown schematically. These include: a communications subsystem 170; a short-range communications subsystem 103; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The mobile device 101 may have a battery 121 to power the active elements of the mobile device 101. The mobile device 101 is in some embodiments a two-way radio frequency (RF) communication device having voice and data communication capabilities. In addition, the mobile device 101 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 101 may also be stored to the RAM 118.

The microprocessor 128, in addition to its operating system functions, enables execution of software applications on the mobile device 101. A predetermined set of software applications that control basic device operations, such as a voice communications module 130A and a data communications module 130B, may be installed on the mobile device 101 during manufacture. In addition, a personal information manager (PIM) application module 130C may also be installed on the mobile device 101 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture. One or more of the modules 130A, 130B, 130C, 130N of the flash memory 116 can be configured for implementing features similar to those of the radio manager 14 of the mobile device 10 shown in FIG. 2.

Communication functions, including data and voice communications, are performed through the communication subsystem 170, and possibly through the short-range communications subsystem 103. The communication subsystem 170 includes a receiver 150, a transmitter 152 and one or more antennas, illustrated as a receive antenna 154 and a transmit antenna 156. In addition, the communication subsystem 170 also includes a processing module, such as a digital signal processor (DSP) 158, and local oscillators (LOs) 160. The communication subsystem 170 having the transmitter 152 and the receiver 150 is an implementation of a specific example of the wireless access radio 12 of the mobile device 10 shown in FIG. 2. The specific design and implementation of the communication subsystem 170 is dependent upon the communication network in which the mobile device 101 is intended to operate. For example, the communication subsystem 170 of the mobile device 101 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. The communication subsystem 170 may also be designed to operate with an 802.11 Wi-Fi network, and/or an 802.16 WiMAX network. Other types of data and voice networks, both separate and integrated, may also be utilized with the mobile device 101.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 101 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile device 101. In addition, the display 126 may also be utilized in voice communication mode, for example, to display the identity of a calling party, the duration of a voice call, or other voice call related information.

The short-range communications subsystem 103 enables communication between the mobile device 101 and other proximate systems or devices, which need not necessarily be similar devices. For example, the short-range communications subsystem may include an infrared device and associated circuits and components, or a Bluetooth™ communication module to provide for communication with similarly-enabled systems and devices.

Numerous modifications and variations of the present application are possible in light of the above teachings. It is therefore to be understood that within the scope of the appended claims, the application may be practiced otherwise than as specifically described herein.

The invention claimed is:
1. A method in a wireless device comprising:
configuring the device for discontinuous reception (DRX) wherein for DRX the wireless device has periods of on durations when a radio is on and periods when the radio is to be off;
receiving a first transmission during an on-duration;
if the first transmission was not successfully received sending a negative acknowledgement (NACK) and entering an additional on-duration wherein the additional on-duration is during a period when the radio is to be off and where the radio is on, the start of the additional on-duration based upon a hybrid automatic repeat request (HARQ) round-trip time (RTT), the additional on-duration encompassing a plurality of retransmission opportunities;
monitoring for an asynchronous retransmission during the additional on-duration; and
monitoring for dynamic allocations during the additional on-duration.
2. The method of claim 1, wherein entering an additional on-duration comprises:
starting a timer to determine the start of the additional on-duration; and wherein the on-duration includes a time that the timer is running.

3. A wireless device comprising:
a radio configured for discontinuous reception (DRX) wherein for DRX the wireless device has periods of on durations when a radio is on and periods when the radio is to be off;
the radio further configured to receive a first transmission during an on duration; and
a radio manager configured to command the radio to enter an additional on-duration wherein the additional on duration is during a period when the radio is to be off and where the radio is on, the start of the additional on duration based upon a hybrid automatic repeat request (HARQ) round-trip time (RTT) if the first transmission was not successfully received, the additional on duration encompassing a plurality of retransmission opportunities;
wherein the device is further configured to monitor for dynamic allocations during the additional on duration.

4. The wireless device of claim 3 further comprising a timer, wherein the timer is started to determine the start of the additional on-duration, and wherein the radio manager is further configured to command the radio to an on duration while the timer is running.

5. A method in a wireless device comprising:
controlling at least one of a transmitter and a receiver to have on periods of nominal on duration during which at least one of the transmitter and the receiver is on and periods when the at least one of the transmitter and the receiver is to be off;
communicating during at least one of the periods of nominal on duration;
controlling at least one of the transmitter and receiver to be on for an additional on period the start of the additional on duration based upon a hybrid automatic repeat request (HARQ) round trip time (RTT) upon determining there will be a retransmission in respect of a communication during one of said on periods of nominal on duration, the additional on duration encompassing a plurality of retransmission opportunities and is during a period when the at least one of the transmitter and receiver is to be off and where the at least one of the transmitter and receiver is on.

6. The method of claim 5 further comprising:
receiving signalling that defines the nominal on duration.

7. The method of claim 5 further comprising:
monitoring for dynamic allocations during the additional period.

8. The method of claim 5 wherein controlling at least one of the transmitter and the receiver to be on for an additional period comprises:
starting a timer after determining there will be a retransmission;
keeping at least one of the transmitter and the receiver on while the timer is running notwithstanding the nominal on duration.

9. The method of claim 8 further comprising:
monitoring for dynamic allocations while the timer is running.

10. The method of claim 5 wherein controlling at least one of the transmitter and receiver to have on periods of nominal on duration comprises controlling at least the receiver to have on periods of nominal on duration.

11. The method of claim 10 wherein:
communication comprises, during one of said on periods of nominal on duration, receiving a communication;
controlling at least one of the transmitter and the receiver to be on for an additional on period upon determining there will be a retransmission comprises:
determining if the communication was not successful;
if the communication was not successful, controlling at least the receiver to be on for the additional on period to allow for the retransmission in respect of the communication that was not successful.

12. The method of claim 11 wherein controlling at least the receiver to be on for the additional on period to allow for the retransmission in respect of the communication that was not successful comprises controlling at least the receiver to be on while a timer is running;
the method further comprising starting the timer after determining the communication was not successfully received.

13. The method of claim 12 further comprising:
transmitting a negative acknowledgement if the communication was not successfully received;
starting the timer is triggered by negative acknowledgement transmission.

14. A non-transitory computer readable medium having computer readable instructions stored thereon that when executed by a wireless device having a transmitter and a receiver implement a method comprising:
controlling at least one of the transmitter and the receiver to have on periods of nominal on duration during which at least one of the transmitter and the receiver is on and periods when the at least one of the transmitter and the receiver is to be off;
controlling at least one of the transmitter and receiver to be on for an additional on period, the start of the additional on duration based upon a hybrid automatic repeat request (HARQ) round trip time (RTT) upon determining there will be a retransmission, the additional on period encompassing a plurality of retransmission opportunities and is during a period when the at least one of the transmitter and receiver is to be off and where the at least one of the transmitter and receiver is on.

15. A method in a wireless network for communicating with a mobile device, the method comprising:
transmitting signalling that defines on periods each having a nominal on duration, such that the mobile device will be expected to have at least one of a receiver and transmitter in the mobile device on for every on period and periods when the at least one of the transmitter and the receiver is to be off; and
transmitting signalling that defines additional on periods, the start of the additional on duration based upon a hybrid automatic repeat request (HARQ) round trip time (RTT) for the mobile device for retransmissions, such that the mobile device will be expected to have the at least one of the receiver and transmitter on for each additional on period for which a retransmission is expected, the additional on periods encompassing a plurality of retransmission opportunities and is during a period when the at least one of the transmitter and receiver is to be off and where the at least one of the transmitter and receiver is on.

16. The method of claim 15 wherein:
transmitting signalling that defines additional on periods comprises transmitting an inactivity timer duration.

17. The method of claim 15 wherein:
transmitting signalling that defines additional on periods comprises transmitting signalling that defines at least one of the additional on periods to be immediately following a respective one of the periods of nominal on duration.

18. The method of claim 17 wherein:
transmitting signalling that defines additional on periods comprises transmitting signalling that defines at least one of the additional on periods such that there is a gap between the end of a respective one of the periods of nominal on duration and the additional on period.

19. A non-transitory computer readable medium having computer readable instructions stored thereon that when executed by a wireless network control the network to implement a method for communicating with a mobile device, the method comprising:
transmitting signalling that defines on periods each having a nominal on duration, such that the mobile device will be expected to have at least one of a receiver and transmitter in the mobile device on for every on period and periods when the at least one of the transmitter and the receiver is to be off; and
transmitting signalling that defines additional on periods, the start of the additional on duration based upon a hybrid automatic repeat request (HARQ) round trip time (RTT) for the mobile device for retransmissions, such that the mobile device will be expected to have at least one of the receiver and transmitter of the radio on for each additional on period for which a retransmission is expected, the additional on period encompassing a plurality of retransmission opportunities and is during a period when the at least one of the transmitter and receiver is to be off and where the at least one of the transmitter and receiver is on.

20. An apparatus for providing communications services to a mobile device, the apparatus comprising:
a discontinuous reception controller that determines discontinuous reception control parameters for a mobile device, the discontinuous reception control parameters indicating on periods during which the mobile device will nominally have at least one of a transmitter and receiver in the mobile device powered on and periods when the at least one of the transmitter and the receiver is to be off, the discontinuous reception control parameters further indicating additional on periods during which the mobile device will have at least one of the transmitter and receiver powered on for the purpose of retransmission in the event a retransmission is expected, the start of the additional on periods based upon a hybrid automatic repeat request (HARQ) round trip time (RTT) and, the additional on periods encompassing a plurality of retransmission opportunities and is during a period when the at least one of the transmitter and receiver is to be off and where the at least one of the transmitter and receiver is on;
a transceiver and at least one antenna for establishing a wireless link with the mobile device, the transceiver being used to transmit the discontinuous reception control parameters to the mobile device and to communicate with the mobile device in accordance with the discontinuous reception control parameters.

21. A mobile device comprising:
a wireless access radio for sending and receiving wireless communications to and from a network;
a radio manager that controls when the wireless access radio is on and when the wireless access radio is off;
the radio manager configured to perform control of the wireless access radio in accordance with discontinuous reception control parameters received from the network via the wireless access radio, the discontinuous reception control parameters indicating on periods of nominal on duration during which the wireless access radio will nominally be powered on and periods when the wireless access radio is to be off;
the radio manager further configured to control the wireless access radio to be on for an additional on period, the start of the additional on duration based upon a hybrid automatic repeat request (HARQ) round trip time (RTT) upon determining a retransmission is expected~the additional on duration encompassing a plurality of retransmission opportunities and is during a period when the wireless access radio is to be off and where the wireless access radio is on.

22. The mobile device of claim 21 wherein the wireless device is configured to communicate during the on periods of nominal on duration using a semi-persistent resource by receiving downlink transmissions using a downlink semi-persistent resource.

23. The mobile device of claim 21 wherein the wireless device is configured to communicate during the on periods of nominal on duration using a semi-persistent resource by transmitting uplink transmissions using an uplink semi-persistent resource.

* * * * *